United States Patent [19]

Astheimer et al.

[11] Patent Number: 5,063,464
[45] Date of Patent: Nov. 5, 1991

[54] LOW PROFILE SUSPENSION

[75] Inventors: Hans Astheimer, Winterbach; Helma Brumme; Werner Heck, both of Mainz; Klaus Kissel, Russelsheim; Hubert Schuy, Mainz, all of Fed. Rep. of Germany

[73] Assignee: International Business Machines Corporation, Armonk, N.Y.

[21] Appl. No.: 520,566

[22] Filed: May 8, 1990

[51] Int. Cl.⁵ .......................... G11B 5/60; G11B 21/21
[52] U.S. Cl. .................................................... 360/104
[58] Field of Search .......................................... 360/104

[56] References Cited

U.S. PATENT DOCUMENTS 4,797,763  1/1989  Levy et al. ........................... 360/104
5,003,420  3/1991  Hinlein ................................. 360/104

FOREIGN PATENT DOCUMENTS 55-142464  11/1980  Japan ................................... 360/104

Primary Examiner—Robert S. Tupper
Attorney, Agent, or Firm—Robert W. Lahtinen

[57] ABSTRACT

The present invention relates to a magnetic head suspension in a magnetic disk storage with a record carrier moved relative to the magnetic head and separated therefrom by an air cushion. The head suspension assembly with suspension arm 3, flexure 19 and slider 30 is fixed to an arm portion 1 at a point where arm portion 1 is provided with a ramp 2. This ramp eliminates prebiasing the suspension arm 3. The free end of the suspension arm 3 is provided with a raised portion 5. The elements 25, 26 fixing the tongue 27 to the flexure 19, in particular the bracket 25 with the attached tongue 27 on which the slider 30 is arranged, are substantially recessed in the raised portion 5 of the suspension arm 3. As a result, there is a noticeably reduced overall height.

17 Claims, 3 Drawing Sheets

LOW PROFILE SUSPENSION

FIELD OF THE INVENTION

The present invention relates to magnetic disk drive data storage devices and more particularly to an improved head suspension for use in a magnetic disk storage device.

BACKGROUND OF THE INVENTION

The use of magnetic disks for data storage has become widespread in the computer industry (U.S. Pat. No. 4,535,374). Data can be stored on both sides of a magnetic disk in concentric circular recording tracks. To translate data to and from a spinning disk during read/write operations, at least one magnetic transducer is situated within micrometers of a surface of the disk. To accommodate such positioning, the transducer is affixed to a specially designed platform. The platform is aerodynamically designed to fly on a thin cushion of ambulant air adjacent to the recording surface that is created by the spinning disk. The air cushion serves to define the clearance between the communicating faces of the transducer/platform combination, hereinafter referred to as a head, and spinning disk.

Each head in a magnetic disk storage system is supportably connected to a flexure. The flexure allows the head to pitch and roll relative to the associated disks spinning surface, so that a substantially parallel relationship between the communicating faces of the head and disk can be maintained during read/write operations. Such parallel relationship contributes to accurate data translation.

Typically, the flexure is supportably connected to the free end of a predominantly flat, cantilevered suspension arm which is attached to a movable carriage adjacent to the associated disk. To radially access the plurality of concentric recording tracks on a magnetic disk, the carriage is oriented so as to move along a horizontal axis that coincides with a radial line extending from the center of the associated disk. Since the position of the carriage relative to the disk is electrically controllable, the head, which is operatively associated with the carriage, can be radially positioned to read from and write onto each of the concentric recording tracks.

The suspension arm, or a component member thereof, is spring-loaded in a conventional manner to provide a vertical loading force on the head so as to urge the head towards the associated disk, and counterbalance the air bearing force associated with the afore-mentioned cushion of ambulant air. In this manner, the desired head/disk clearance can be maintained during read/write operations as variations in the disk surface are encountered. Maintenance of a near constant head/disk clearance, and substantially parallel relationship between the head and disk as previously discussed, is necessary to ensure accurate data translation and minimal head/disk destructive contact. It should be emphasized that the density of data stored on a magnetic disk, and the signal-to-noise ratio established during data translation, can be increased as the head/disk clearance constant is decreased. Therefore, it is desirable to maintain as small a clearance constant as possible to maximize both the accuracy of data translation and the data storage capabilities of a computer system. The smallest head/disk clearance constant found in a commercially available disk drive system is realized through the employment of a unique head/flexure/suspension arm combination, as illustrated and described in U.S. Pat. No. 4,167,765. That combination is known in the art as Whitney technology. The combination of a Whitney head, flexure and suspension arm is presently employed in the IBM 3370 and 3380 disk drive systems.

An essential disadvantage of the suspension arm presently used in magnetic disk storages is that it is subjected to a special bending process which serves to produce the initial load force. During this process, the predetermined initial load force is coarse-adjusted to be fine-adjusted during head assembly, tested for separation limits and sorted. After the head/suspension assembly (suspension arm, flexure, slider) has been mounted on the arm portion, the initial load force is again measured and adjusted, if required.

The bending process of the suspension arm is rendered particularly elaborate by the fact that in addition to the initial load force, a non-planarity (S-shaped bend) to be accurately defined is imparted to the suspension arm, to ensure particular resonance characteristics. For this purpose, the manufacturer of the suspension has to optimize the desired value of the load force and the non-planarity in the bending range by matrix testing.

A further disadvantage of the head suspensions currently used in magnetic disk storages is that their design is such that they require a clear disk spacing of 8 to 9 mm.

However, as the trend of magnetic data storage technology is from 35.56 cm (14 inch—high-end) to 13.33 or 8.25 cm (5.25 or 3.25 inch—low-end) files, this means technically that it is necessary to increase the number of bits per inch and to reduce the clear magnetic disk spacing. The clear spacing of currently planned "IBM low-end files" is 3.5 mm. This is the spacing available for installing an arm portion with two magnetic head suspensions above each other. Such a clear spacing necessitates a reduction of the overall height of the magnetic head suspension and a slider that can be moved closer to the surface of the magnetic disk. The reduction of the clear disk spacing makes great demands on the design of the magnetic head suspension, since the reduction in the overall height of the magnetic head suspension and the fact that, as a result, the slider has to be moved closer to disk surface, adversely affect the oscillation and flight characteristics of the slider.

Therefore, the design of the magnetic head suspension must be such that the reduction of the overall height of the magnetic head suspension does not adversely affect the oscillation and flight characteristics of the slider and that the magnetic head suspension is easy to produce and to install.

This requirement is not met by the magnetic head suspensions currently used in magnetic disk storages.

German Patent 25 34 205 describes a magnetic head suspension, the spring element of which is provided with a triangular portion, the base of which terminates in a rectangle and the apex of which comprises a framelike square acting as the actual magnetic head suspension.

The triangular portion has raised edges forming a groove in which the flat and equally triangular intermediate piece is fixed, with the bent extension of the latter acting as a support face for the magnetic head.

The framelike square is made up of two horizontally positioned outer frame sections and two outer vertically positioned crosspieces. A tongue, positioned parallel to the frame sections and supporting the slider, extends from the outer frame crosspiece.

Such a magnetic head suspension has a complex design and is difficult to produce and assemble. The slider in particular must be designed such that it may be installed between the tongue and the intermediate piece. This involves very tight production tolerances for the slider and is technically unfavorable, as the slider is the most expensive component of the magnetic head suspension.

IBM Technical Disclosure Bulletin, Vol. 28, No. 6, Nov. 1985, p. 2492, describes a magnetic head suspension consisting of an arm attachment to which ramp plates bent on either side are fixed, with each ramp plate supporting a prebiased suspension arm, on whose free end the slider is mounted.

With this magnetic head suspension, too, it is necessary for the suspension arm to be mounted on the ramp plate in a prebiased state. The ramp plate does not eliminate fine and subsequent adjustment of the suspension arm.

A further difference is that the ramp plate is designed as a separate bent element which is mounted to the arm attachment.

The magnetic head suspension of none of the afore-mentioned prior art material is suitable for obtaining the clear disk spacing of as little as, say, 3.5 mm, as is required by low-end files.

SUMMARY OF THE INVENTION

To eliminate these disadvantages, the invention comprises an arm portion eliminating the complicated bending process of the suspension arm and the fine and subsequent adjustment associated therewith, as well as a non-planar area in the bending range of the suspension arm, which also reduces the overall height of the magnetic head suspension.

The afore-mentioned disadvantages are overcome in principle by the features covered by the claims appended hereto. The magnetic head suspension in accordance with the invention is described in detail below with reference to drawings which illustrate a specific embodiment.

DETAILED DESCRIPTION

Figure 1:
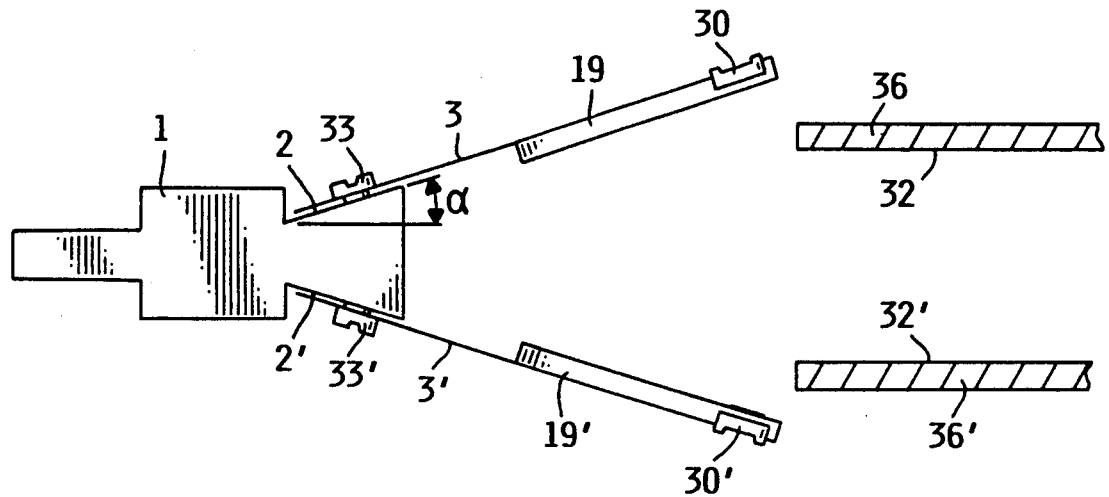
FIG. 1 shows an embodiment of the arm portion according to the invention with the low profile suspension fixed thereto prior to installation in the magnetic disk pack.

FIG. 1 shows an embodiment of the magnetic head suspension according to the invention prior to installation in the magnetic disk pack.

The arm portion 1 according to the invention has an inclined surface 2 which may be shaped as a ramp at the point of attachment of the suspension arm 3. The ramp 2 is preferably arranged at an angle alpha of about 12~ to the access direction on arm portion 1.

The suspension arm 3 may be fixed to the ramp by screws 33, as shown in FIG. 1. It is mounted on the ramp 2 in an unbiased (i.e., an unloaded) state, resting thereon with absolute planarity.

As shown in FIG. 1, arm portion 1 may be provided with a further ramp 2' which is preferably arranged in a mirror-inverted fashion to the first ramp 2 and on which a second magnetic head suspension, consisting of a suspension arm 3', a flexure 19' and a slider 30', is positioned.

Figure 2:
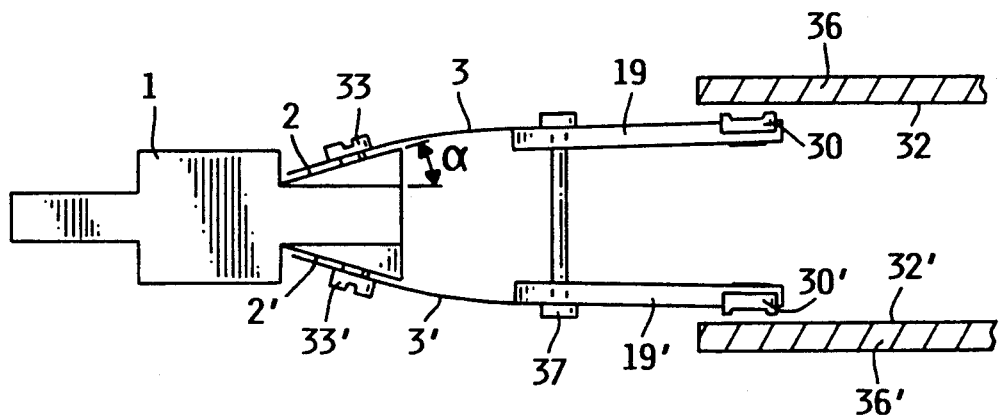
FIG. 2 shows the magnetic head suspension of FIG. 1 in installed state.

FIG. 2 shows the magnetic head suspension of FIG. 1 in the installed state.

Upon installation in the magnetic disk pack, the suspension arm 3, 3' is bent back to such an extent that the slider 30, 30' is immersed between the surfaces 32, 32' of the magnetic disks 36, 36' (shown only partially). It is only in this state that the spring force produced by bending the suspension arm 3, 3' imposes a load on the slider 30, 30'.

The angle alpha of the ramp 2, 2' determines the magnitude of the spring force of the suspension arm 3, 3'.

This ramp 2, 2' eliminates in particular the elaborate bending process required by the suspension arm of the Whitney or Winchester suspension and the fine and subsequent adjustment of the bias or initial load connected therewith.

A further advantage of this ramp 2, 2' is that the defined non-planarity of the suspension arm 3, 3' in the bending range is eliminated.

In addition, this ramp 2, 2' eliminates the mounting block previously provided in actually built magnetic head suspensions and which served to fix the suspension arm 3, 3' to the arm portion 1. As a result, the overall height of the magnetic head suspension is decreased. The ramp 2, 2' may form an integral part of the arm portion 1, as shown in FIG. 1, or be fixed in modular design as a separate component, as shown in FIG. 2, to the arm portion 1.

Figure 3:
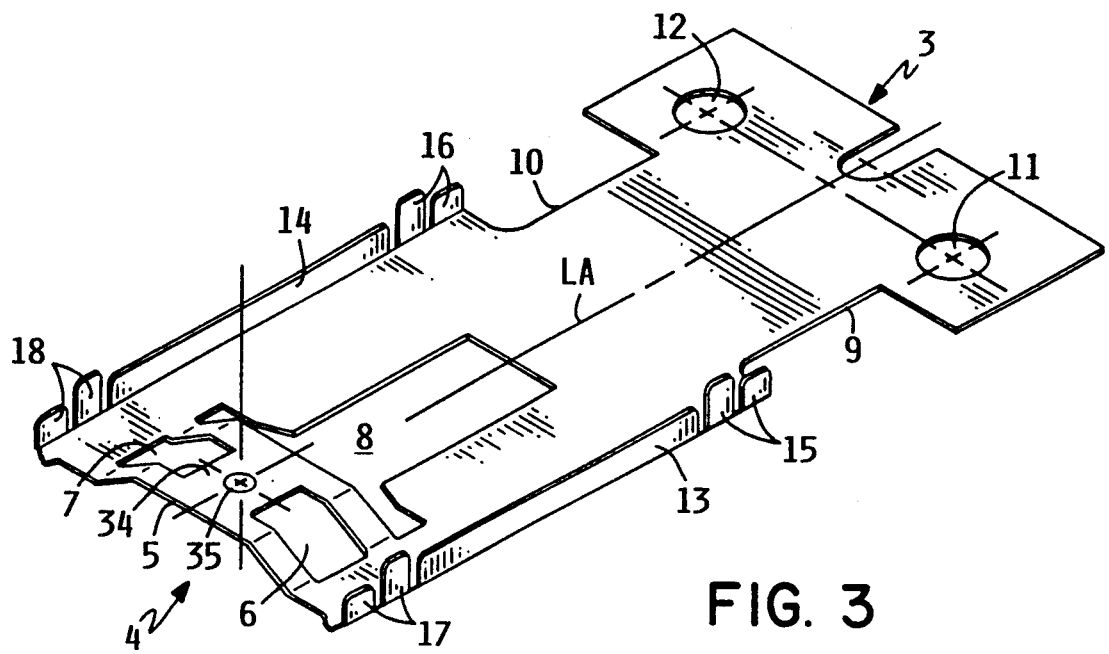
FIG. 3 shows an embodiment of the suspension arm according to the invention.

FIG. 3 shows an embodiment of the suspension arm 3 as it may be used for the magnetic head suspension of the invention.

The free end 4 of the suspension arm 3 is provided with a raised portion 5 that may be frustrum-shaped, for example. This raised portion 5 comprises on either side relative to the longitudinal axis LA of the suspension arm 3 recesses 6, 7 which may be rectangularly shaped. Recesses 6, 7 are arranged in the base area 34 of the raised portion 5 such that the surface of the frustrum remaining adjacent to the two recesses 6, 7 is H-shaped. The recesses 6, 7 ensure that the slider 30 is freely movable within its operating range without touching any other components.

A further embodiment of the suspension arm 3 may consist in the raised portion 5 being provided with a dimple 35 which transfers the bending force from the suspension arm 3 to the flexure tongue 27. As shown in FIG. 3, dimple 35 may take the form of a hemisphere protruding into the inside of the raised portion 5. This special design of dimple 35 has the particular advantage that force transfer from the suspension arm 3 to the flexure tongue 27 is effected in point fashion, and that the shape of dimple 35 does not adversely affect the freedom of movement of the flexure tongue 27. The raised portion 5 tapers off towards the surface of the suspension arm 3 continuing in a recess 8, which may be rectangularly shaped, on the surface of the suspension arm along its longitudinal axis LA.

The bending area of the suspension arm 3 is defined by two recesses 9, 10 which, along the outer edges of suspension arm 3, may be shaped rectangularly, for example.

At the end where the suspension arm 3 is fixed, means, such as bores 11, 12, are provided for connecting the suspension arm 3 to the arm portion 1.

In addition, the suspension arm is fitted on its two outer sides with stiffening means (13, 14) and wire fixing means 15 to 18. The thickness of the material (preferably stainless steel) of the suspension arm according to the invention preferably is 76 microns.

Figure 4:
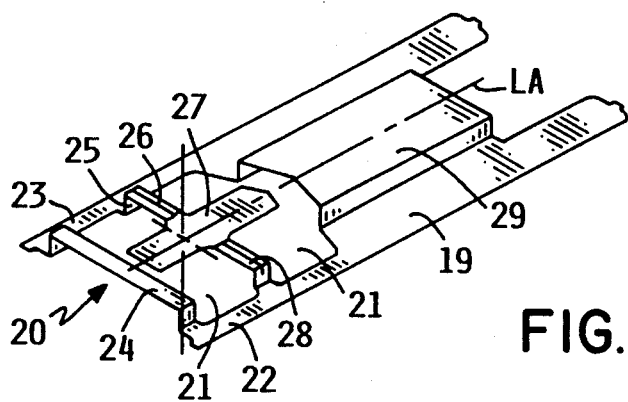
FIG. 4 shows an embodiment of the flexure according to the invention.

FIG. 4 shows an embodiment of the flexure as it may be used for the magnetic head suspension of the invention.

The free end 20 of the flexure 19 comprises a, say, rectangularly shaped recess 21. This recess 21 is designed such that frame sections 22, 23 are formed on either side of the longitudinal axis LA. These frame sections 22, 23 are interconnected by spaced brackets 24, 25 raised relative to the surface of the flexure and the frame sections 22, 23, respectively. The crosspiece 26 of bracket 25, extending transversely to the longitudinal axis LA of the flexure 19, comprises along said center axis LA a tongue 27 which may be rectangularly shaped. A further embodiment of the bracket 25, to which the tongue 27 is attached, provides for the longitudinal axis of the bracket 25 to include a small recess 28 which improves the compliance characteristics of the slider 30.

The two frame sections 22, 23 continue in a, say, cuboid-shaped raised portion 29 which serves to keep the flexure 19 relatively stiff in that area.

The flexure 19 according to the invention is designed such that its stiffness in the pitch and roll direction is about 2 to 3 times higher than that of the Whitney flexure. This is essentially attributable to the fact that the flexure area in which the slider is positioned is smaller than that of the art. As a result of the increased stiffness of the flexure, the parameters of the suspension arm and the flexure determine the flight height of the slider rather than vice versa, as is the case with currently known magnetic head suspensions. The thickness of the material (preferably stainless steel) of the flexure 19 according to the invention preferably is 50 microns.

A decisive advantage of this is that the tight production tolerances to be observed apply to less expensive components, such as flexure 19 and suspension arm 3, rather than to the very expensive slider 30. This shift in tolerance requirements also reduces the production cost of the magnetic head suspension.

Figure 5:
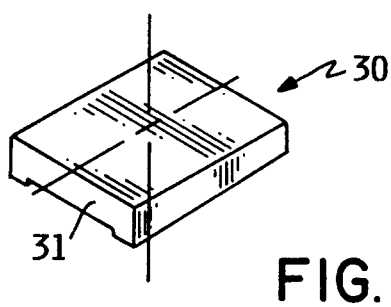
FIG. 5 shows an embodiment of the slider suitable for use in the magnetic head suspension according to the invention.

FIG. 5 shows a slider 30 with a magnetic transducer (thin-film head) 31 suitable for attachment to the flexure 19 according to the invention.

Figure 6:
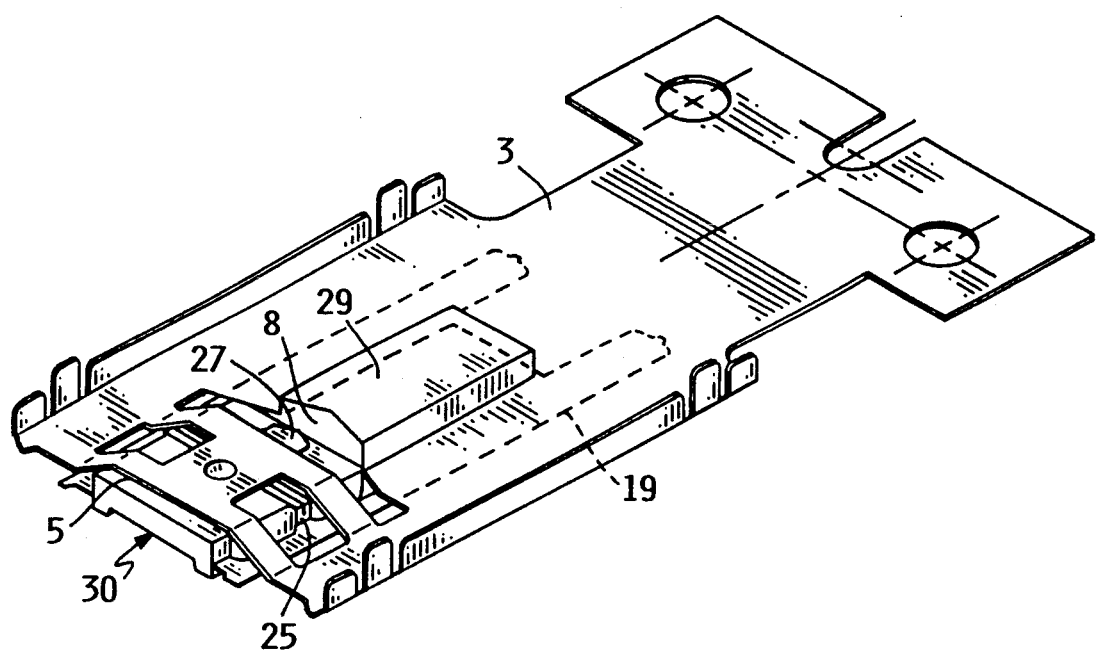
FIG. 6 shows an embodiment of the magnetic head suspension in the assembled state.

FIG. 6 shows the suspension arm 3, the flexure 19 and the slider 30 in the assembled state.

Flexure 19 is connected to the suspension arm 3 such that its raised portion 29 is substantially positioned within the flat recess 8 of the suspension arm 3.

The elements 25 fixing the tongue 27 to the flexure 19, in particular the bracket 25 with the attached tongue 27 on which the slider 30 is arranged, are substantially recessed in the raised portion 5 of the suspension arm, so that the slider 30 is also partly recessed therein. This considerably reduces the overall height of the magnetic head suspension according to the invention.

The flexure 19 may be either welded or glued to the suspension arm 3. An advantageous tested embodiment provides for the flexure 19 to be glued to the suspension arm 3. As a result, the components are physically isolated from each other, and the glue has the function of damping oscillations to such an extent that they are not transferred to the slider. The glue used is preferably Eastman 9330.

With regard to manufacture and assembly, the magnetic head suspension according to the invention has considerable advantages over known magnetic head suspensions. It is pointed out, for example, that ramp 2 according to the invention eliminates the mounting block required for known head suspensions. In addition, the magnetic head suspension according to the invention is safer in the case of handling defects, as slider 30 is substantially recessed in the raised portion 5 of the suspension arm 3.

It is pointed out in particular that the base area 34 of the raised portion 5 of suspension arm 3 is of considerable importance to the assembly of the magnetic head suspension in the magnetic disk pack. Prior to their assembly in the magnetic disk pack, the two suspension arms 3, 3' arranged opposite each other on arm portion 1 are bent back to such an extent that they are arranged in parallel in base area 34. In this position, the two suspension arms 3, 3' are fixed by clips 37 to be inserted into the magnetic disk pack. Thus, the base area 34 of the raised portion 5, in addition to facilitating the assembly of the magnetic head suspension, prevents that the suspension arm is excessively bent. The raised portion 5 of the suspension arm 3 thus serves the triple function of reducing the overall height of the magnetic head suspension, of protecting the slider 30 against handling defects during manufacture or assembly, and of allowing accurate assembly of the magnetic head suspension.

What is claimed is:

1. A magnetic head suspension in a magnetic disk storage device, wherein at least one magnetic head suspension is associated with a magnetic disk recording surface, comprising a slider which, upon adequate rotation of the confronting magnetic disk, is maintained above the magnetic disk surface by an air cushion;

a magnetic head fixed to said slider;

a flexure fixed to said slider;

a suspension arm fixed to said flexure having a longitudinal axis and engaging said flexure to exert a load force on said slider through said flexure; and an arm portion connected to and supporting said suspension arm;

the free end of said suspension arm on the side averted from the magnetic disk surface being provided with a relatively stiff raised portion which forms a recess and extends in the direction of the longitudinal axis of said suspension arm, a tongue portion of said flexure disposed within said recess adjacent the raised portion upper upper region and movable parallel thereto, said slider being fixed to said tongue surface facing the opening of said recess, said tongue being parallel to and above the surface of the portion thereof attached to said suspension arm at a spacing which is less than the depth of said recess, and said flexure being connected to said suspension arm such that the means used to fix said slider to said flexure is positioned in the recess portion of said suspension arm.

2. The magnetic head suspension according to claim 1 wherein on either side of said suspension arm recess and extending in the direction of the longitudinal axis first and second cut out portions are provided such that at least one base area is formed on the suspension arm.

3. The magnetic head suspension of claim 2 wherein said first and second cutout portions in said suspension arm are rectangularly shaped, and the base area of the raised portion produced by the first and second cut out portions is H-shaped.

4. The magnetic head suspension according to claim 3 wherein, viewed from the side, the raised portion of said suspension arm is frustrum-shaped.

5. The magnetic head suspension according to claim 4 wherein the tongue is of generally rectangular shape.

6. The magnetic head suspension according to claim 5 wherein the tongue is fixed by a first rectangularly shaped bracket formed as an integral portion of the flexure and extending transversely to its longitudinal axis.

7. The magnetic head suspension according to claim 6 wherein said first bracket is provided with a small groove along its longitudinal axis.

8. The magnetic head suspension according to claim 6 wherein
said flexure is attached adjacent one end thereof to said suspension arm and presents a free end at the end opposite said one end,
the free end of said flexure is provided with a second bracket which is axially spaced from and parallel to said first bracket, and
the flexure surface enclosed by said brackets is recessed such that small frame sections interconnected by said brackets are formed on either side relative to the longitudinal axis of the flexure.

9. The magnetic head suspension according to claim 8 characterized in that the said small frame sections are axially adjoined by a flexure raised portion extending relative to the surface of the flexure, with the raised portion being frustrum shaped.

10. The magnetic head suspension according to claim 1 characterized in that the recess forming raised portion of the suspension arm tapers off relative to the surface of the latter, continuing in a third cut out portion of the suspension arm along its longitudinal axis, said suspension arm third cut out portion being rectangularly shaped.

11. The magnetic head suspension according to claim 10 characterized in that the flexure is connected to the suspension arm such that the raised portion of the flexure is located in the third cut out portion of the suspension arm.

12. The magnetic head suspension according to claim 1 characterized in that the slider is positioned on the tongue by gluing and the flexure-slider assembly is connected to the suspension arm also by gluing.

13. The magnetic head suspension according to claim 1 characterized in that stiffening and wiring means are provided along the outer edges of the suspension arm.

14. The magnetic head suspension according to claim 1 characterized in that the suspension arm includes a bending area and in such bending area is provided with rectangular recesses along the outer edges thereof.

15. The magnetic head suspension according to claim 14 characterized in that
the arm portion has a first inclined surface arranged on the former such that, at the point of intersection, the plane formed by the first inclined surface and the plane formed by the magnetic disk surface enclose an acute angle alpha,
the suspension arm is fixed with absolute planarity and without tension to the inclined surface, and
the necessary load force transferred by the flexure from the suspension arm to the slider is produced only upon installation of the magnetic head suspension by arranging the slider on the magnetic disk surface.

16. The magnetic head suspension according to claim 15 characterized in that the arm portion has a second inclined surface which is arranged in mirror-invented fashion relative to the first inclined surface on the arm portion such that a second magnetic head suspension is associated with a second magnetic disk surface facing the said magnetic disk surface.

17. The magnetic head suspension according to claim 16 characterized in that the acute angle alpha is approximately 12 degrees.

* * * * *